United States Patent [19]

Johns

[11] Patent Number: 4,897,925
[45] Date of Patent: Feb. 6, 1990

[54] APPARATUS FOR DETERMINING SURFACE PROFILES OF METALLIC WORKPIECES

[75] Inventor: Robert H. Johns, Natrona Heights, Pa.

[73] Assignee: Allegheny Ludlum Corporation, Pittsburgh, Pa.

[21] Appl. No.: 132,294

[22] Filed: Dec. 15, 1987

[51] Int. Cl.$^4$ .............................................. G01B 5/28
[52] U.S. Cl. ...................................... 33/22; 33/23.01; 33/546; 33/551
[58] Field of Search ...................... 33/23, 23.01, 23.02, 33/23.04, 23.05, 23.07, 23.08, 23.10, 25.1, 25.2, 546, 549, 551, 553, 554, 555, 556, 533, 503, 521

[56] References Cited

U.S. PATENT DOCUMENTS

| | | | |
|---|---|---|---|
| 731,066 | 6/1903 | Nye | 33/23.01 |
| 2,543,184 | 2/1951 | Marvosh | 33/546 |
| 2,706,340 | 4/1955 | Johnston | 33/23.01 |

FOREIGN PATENT DOCUMENTS

| | | | |
|---|---|---|---|
| 1962996 | 7/1971 | Fed. Rep. of Germany | 33/546 |
| 934196 | 6/1982 | U.S.S.R. | 33/546 |
| 757847 | 9/1956 | United Kingdom | 33/554 |
| 1323683 | 7/1973 | United Kingdom | 33/23.02 |

Primary Examiner—William A. Cuchlinski, Jr.
Assistant Examiner—Patrick R. Scanlon
Attorney, Agent, or Firm—Patrick J. Viccaro

[57] ABSTRACT

An apparatus for determining the top and the bottom surface of a metallic workpiece, such as a steel slab. The apparatus is positioned proximate to the workpiece and includes a rail beam which may be translated across the width of the workpiece. A first arm is pivotally coupled to a first end of the rail beam and a second arm is pivotally coupled to a second end of the rail beam. The two arms are pivotally interconnected at top ends thereof by a tie rod, thereby forming three sides of a parallelogram. Deflection of the first arm during translation of the rail beam across causes a similar deflection of the second arm. The deflection of the second arm may be recorded, thereby recreating the surface profile of the workpiece.

10 Claims, 1 Drawing Sheet

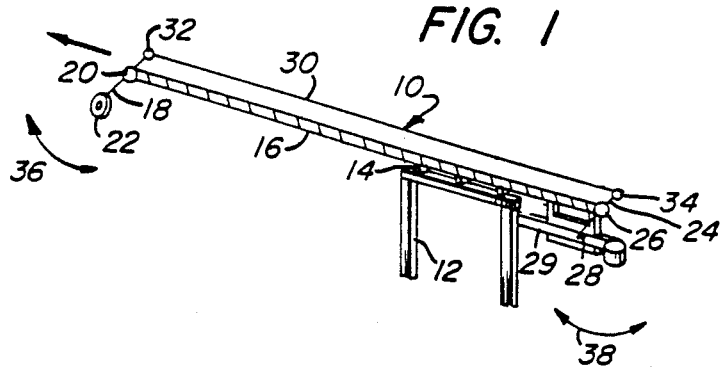
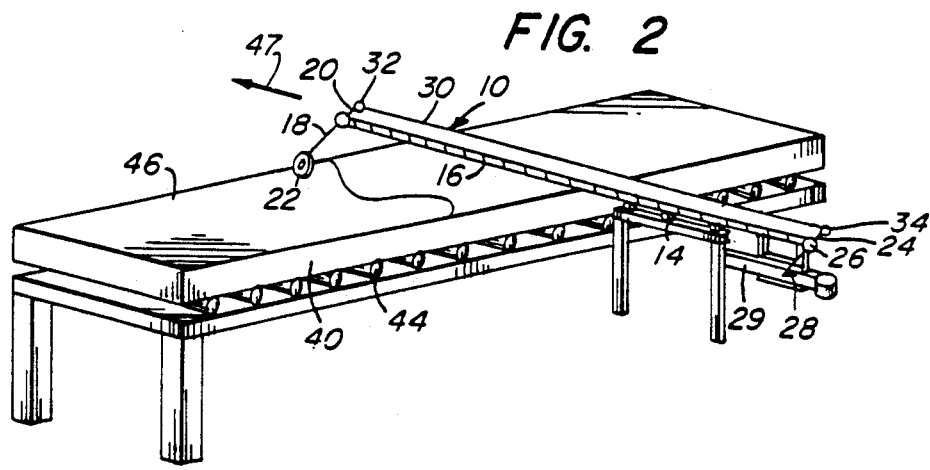
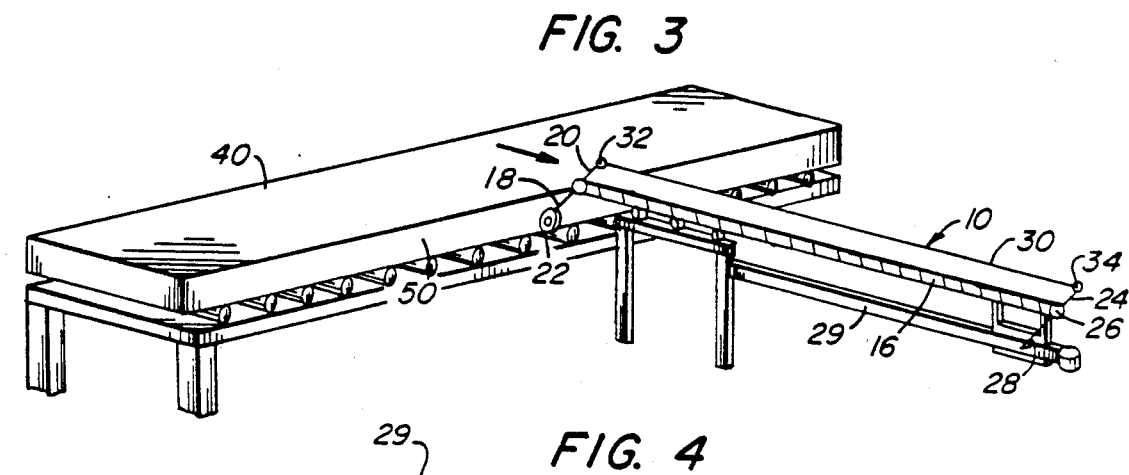
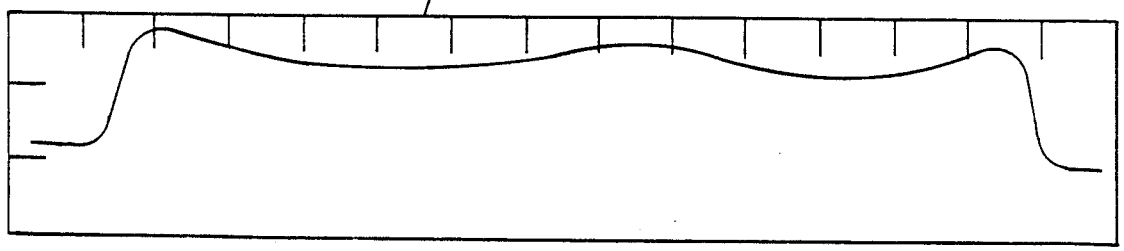

4,897,925

APPARATUS FOR DETERMINING SURFACE PROFILES OF METALLIC WORKPIECES

BACKGROUND OF THE INVENTION

1. Field of the Invention

The present invention relates generally to recording apparatus, and, more particularly, to an apparatus for determining and recording a surface profile of a metallic workpiece.

2. Description of the Prior Art

In the casting of molten metal by continuous casting techniques, close attention is paid to the profiles of the shapes formed by the casting process. In the particular instance in which slabs are produced by the continuous caster, uniform flatness of the slab surfaces is desired. When the surfaces of the slabs are not flat, subsequent processing is required in order to flatten the surfaces. Such processing usually involves grinding operations, which reduces the yield of the slab, and increases production time and expense.

Because the molten metal located in the center portions of the slabs cool at a slower rate than side and end portions of the slabs, slabs produced by the continuous casters occasionally contain "guttered" areas running in lengthwise directions through the slabs. In order to obtain quantitative data to determine casting conditions which minimize such gutters (and, therefore increase the flatness of the slabs), surface profiles of the finished slabs are desired.

One method of quantitatively determining the surface profile of a workpiece requires that a portion of the slab be cut and transported to a remote location whereat the slab portion is cut into sections to provide a cross section of the slab, the surface of which may be analyzed to obtain a surface profile. This is a time consuming and expensive process which cannot be performed during on-line production.

Because such a procedure is so time consuming, a quicker procedure by which a surface profile of the slab is obtained by a qualitative means is more frequently utilized. The profile is obtained by a process known as "guttering". In this process, a long straight edge rule is placed across the top surface of the slab such that the rule traverses opposite sides of the slab. An observer then merely estimates the depth of the guttered areas running along the length of the slab. Such a process is oftentimes quite inaccurate and is of limited precision.

It is therefore an object of the present invention to provide a means for quantitatively determining the surface profile of a metallic workpiece, such as a steel slab.

It is a further object of the present invention to provide a non-invasive means for quantitatively determining both the top and the bottom surface profiles of a metallic workpiece during on-line production of the workpiece.

SUMMARY OF THE PRESENT INVENTION

In accordance with the present invention, an apparatus is disclosed for determining a surface profile of a metallic workpiece. The apparatus includes a surface engaging means for engaging with the surface of the workpiece, a translating means for translating the surface engaging means in a widthwise direction across the workpiece, and a recording means for recording the deflection of the surface engaging means as the surface engaging means is translated across the width of the workpiece, thereby creating a surface profile of the workpiece.

In one embodiment of the present invention, the apparatus includes a support means suitable for positioning proximate to the workpiece. In the preferred embodiment, the support means is comprised of a support frame having rollers positioned on a top surface of the frame extending in a transverse direction to the lengthwise direction of the workpiece. A rail means slidably engages with the rollers of the support frame with the rail means having a length great enough such that the rail means may traverse the width of the workpiece such that the first end of the rail means extends beyond the workpiece. A detection means is pivotally attached to a first end of the rail means for detecting the surface profile of the workpiece as the detection means is deflected during translation of the rail means across the width of the workpiece. The detection means may be comprised of a measuring arm pivotally attached along the length thereof to the rail means and a tracking roll or stylus positioned at a bottom portion of the measuring arm for contacting and engaging with the surface of the workpiece. A recording arm is pivotally attached to a second end of a rail means, and, in the preferred embodiment, the recording arm includes an ink dispenser positioned at an end portion thereof. A connecting means connects the measuring arm and the recording arm, such that the recording arm is deflected responsive to the deflection of the measuring arm. The connecting means is preferably comprised of a tie rod hingedly connected, at one end thereof, to the measuring arm, and hingedly connected, at a second end thereof, to the recording arm, thereby causing the recording arm to deflect when the measuring arm is deflected during translation of the rail means across the width of the workpiece. A recording means is further included for recording the deflection of the recording arm during translation of the rail means. In the preferred embodiment, the recording means is comprised of a paper tape positioned proximate to the ink dispenser.

BRIEF DESCRIPTION OF THE DRAWINGS

The present invention will be better understood when read in light of the enclosed drawings in which:

FIG. 1 is a schematic illustration of the surface profile recording apparatus of the present invention;

FIG. 2 is an illustration of the apparatus of FIG. 1 positioned above a continuous cast slab cast by a continuous caster;

FIG. 3 is an illustration similar to that of FIG. 2 illustrating the final position of the apparatus of the present invention after the surface profile of the continuous cast slab has been recorded by the apparatus; and FIG. 4 is an illustration of a sample surface profile recorded on paper tape by the apparatus of the present invention.

DESCRIPTION OF THE PREFERRED EMBODIMENT

Referring now to the schematic illustration of FIG. 1, there is illustrated the apparatus 10 of the present invention. The apparatus 10 includes, and is supported by, support frame 12. Positioned on a top surface of support frame 12 is roller assembly 14. Mounted upon roller assembly 14 is rail beam 16, which is slidably engagable therewith. Measuring arm 18 is pivotally attached to end 20 of rail beam 16. Positioned at a bottom portion of measuring arm 18 is tracking roll or stylus 22.

Recording arm 24 is pivotally attached to end 26 of rail beam 16. Extending outwardly from a bottom portion of recording arm 24 is ink dispensing pen 28. Positioned beneath pen 28 is paper tape roll 29 which is suitably supported from rail beam 16 to allow the paper tape 29 to unwind during translation of rail beam 16. an end of the paper tape roll 29 may be conveniently attached to support frame 12. Measuring arm 18 and recording arm 24 are interconnected by tie rod 30. Tie rod 30 is pivotally attached to top end 32 of measuring arm 18 at a first end thereof, and is pivotally attached to top end 34 of recording arm 24. Tie rod 30, and arms 18 and 24 pivotally attached thereto, thereby form three sides of a parallelogram. Connected as such, deflection of the measuring arm in directions illustrated by arrow 36 causes a similar deflection of recording arm 24. This resultant deflection of recording arm 24 is illustrated by arrow 38.

FIG. 2 illustrates the measuring apparatus 10 positioned proximate to a steel slab 40 cast by a continuous caster. In the illustration of FIG. 2, slab 40 is positioned upon caster run-out table 44. It is to be noted, however, that the apparatus 20 may similarly be utilized to determine the surface profile of any workpiece 40 at other plant locations.

As illustrated in FIG. 2, rail beam 16 is initially positioned such that tracking roll or stylus 22 of measuring arm 24 extends beyond side 46 of slab 40. In this position, determination of the surface profile of slab 40 may commence. By translating rail beam 16 across roller assembly 14 in the direction illustrated by arrow 47, tracking roll or stylus 22 first contacts with side 46 of the slab 40. Continued translation of rail beam 16 causes tracking roll or stylus 22 to engage with, and roll across, the top surface of slab 40. Changes in the surface contours of slab 40 causes deflection of the tracking roll or stylus 22 and measuring arm 18. Tie rod 30 is caused to translate in response to deflection of measuring arm 24, which, in turn, causes deflection of recording arm 24. Such deflection is recorded on paper tape roll 29 as it unwinds during translation of rail means 16.

Illustrated in FIG. 3 is the apparatus 10 after rail beam 16 has been translated across the width of the slab 40, and tracking roll or stylus 22 has reached side 50 of the slab. Because all deflections of the tracking roll or stylus 22 are recorded on the paper tape 29 by pen 28, the surface profile of the surface of slab 40 is recreated on the paper tape. The paper tape may be removed for subsequent analysis.

A sample surface profile, as may be recorded by the apparatus 10 of the present invention, is illustrated in FIG. 4. The profile illustrated is of slab having two "guttered" areas.

It is to be naoted that the bottom surface profile of slab 40 may be similarly determined by inverting the measuring apparatus 10 and engaging tracking roll with a bottom surface of the slab 40.

While the present invention has been described in connection with the preferred embodiment of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What I claim is:

1. Apparatus for determining a surface profile of a metallic workpiece, said apparatus including:

a measuring arm means for engaging with a surface of the workpiece during translation across the width of the workpiece;

translating means including a support frame and a rail beam slidably positioned on the support frame, said rail beam having a pivotal connection at a first end portion thereof for pivotally connecting said measuring arm means to the rail beam, said translating means serving to translate the measuring arm means in a widthwise direction across the workpiece; and recording means interconnected with the measuring arm means such that pivotal movement of the measuring arm means during translation across the width of the workpiece causes corresponding movement of the recording means to thereby record the surface profile of the metallic workpiece, said recording means including a recording arm pivotally connected to a second end portion of the rail beam, a tie rod for interconnecting the measuring arm and the recording arm such that deflection of the measuring arm during translation across the width of the workpiece causes deflection of the recording arm, an ink dispenser positioned at one end of the recording arm, and a paper tape positioned proximate to the ink dispenser for recording the deflection of the recording arm.

2. Apparatus for determining a surface profile of a metallic workpiece, including:

a support means;

rail means slidably engaging with said support means, said rail means having a length great enough to allow the rail means to be translated to a first position whereat a first end of the rail means is positioned above a side of the workpiece away from the support means, and to be translated to a second position such that the first end of the rail means is positioned above a side of the workpiece proximate to the support means;

detection probe means pivotally attached to the first end of the rail means for detecting the surface profile of the workpiece as the detection means is deflected during translation of the rail means across the width of the workpiece from said first position to said second position;

recording arm means pivotally attached to a second end of the rail means;

connecting means for connecting said detection probe means and the recording arm means such that the recording arm means is deflected responsive to deflection of the detection probe means; and recording means for recording the deflection of the recording arm means.

3. The apparatus of claim 2 wherein said support means includes a support frame having rollers positioned on the top surface thereof.

4. The apparatus of claim 3 wherein said rail means slidably engages with the rollers of the support means to thereby allow translation of the rail means along the rollers.

5. The apparatus of claim 2 wherein said detection probe means includes a measuring arm pivotally attached along the length thereof to the rail means, said measuring arm further containing a tracking roll positioned at a bottom portion thereof for engaging with the surface of the workpiece.

6. The apparatus of claim 2 wherein said recording means further includes an ink dispenser positioned at one end of the recording arm means.

7. The apparatus of claim 6 wherein said recording means includes a paper tape positioned proximate to the ink dispenser.

8. The apparatus of claim 2 wherein said connecting means includes a tie rod hingedly connected at one end thereof to the detection means and hingedly connected at a second end thereof to the recording arm means thereby causing the recording arm means to deflect in response to deflection of the detection probe means when the rail means is translated across the width of the workpiece.

9. The apparatus of claim 2 wherein the measuring arm further includes a tracking stylus positioned at the bottom portion thereof for engaging with the surface of the workpiece.

10. Apparatus for determining a surface profile of a metallic workpiece, said apparatus including:

measuring means including a measuring arm means for engaging at an end portion thereof with the surface of the workpiece;

translating means for translating the measuring arm means in a widthwise direction across the workpiece, said translation means including a support frame and a rail beam slidably positioned on said support frame, said rail beam having a pivotal connection at a first end portion thereof for pivotally connecting said measuring arm means to the rail beam;

recording means including a recording arm pivotally connected to a second end portion of the rail beam, a tie rod for interconnecting the measuring arm and the recording arm such that deflection of the measuring arm during translation across the width of the workpiece causes deflection of the recording arm, an ink dispenser positioned at one end of the recording arm, and a paper tape positioned proximate to the ink dispenser for recording the deflection of the recording arm.

* * * * *